US010997124B2

(12) United States Patent
Chen et al.

(10) Patent No.: US 10,997,124 B2
(45) Date of Patent: May 4, 2021

(54) QUERY INTEGRATION ACROSS DATABASES AND FILE SYSTEMS

(71) Applicant: Hewlett-Packard Development Company, L.P., Houston, TX (US)

(72) Inventors: Qiming Chen, Cupertino, CA (US); Meichun Hsu, Los Altos Hills, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 540 days.

(21) Appl. No.: 14/781,896

(22) PCT Filed: Apr. 2, 2013

(86) PCT No.: PCT/US2013/034995
§ 371 (c)(1),
(2) Date: Oct. 1, 2015

(87) PCT Pub. No.: WO2014/163624
PCT Pub. Date: Oct. 9, 2014

(65) Prior Publication Data
US 2016/0063030 A1    Mar. 3, 2016

(51) Int. Cl.
*G06F 16/18*   (2019.01)
*G06F 16/182*  (2019.01)
(Continued)

(52) U.S. Cl.
CPC ........ *G06F 16/1824* (2019.01); *G06F 16/152* (2019.01); *G06F 16/2456* (2019.01);
(Continued)

(58) Field of Classification Search
CPC ......... G06F 17/30864; G06F 17/30389; G06F 17/30477; G06F 17/30554;
(Continued)

(56) References Cited

U.S. PATENT DOCUMENTS 8,620,945 B2 * 12/2013 Chen ................. G06F 16/24568
707/769
8,874,600 B2 * 10/2014 Gupta ................... G06F 16/245
707/763

(Continued)

FOREIGN PATENT DOCUMENTS

CN      101180626     5/2008
WO   WO-2012050582   4/2012

OTHER PUBLICATIONS

"Hadoop Integration", (Web Page), http://www.gridgain.com/features/hadoop-integration/, 2012, 4 pages.

(Continued)

*Primary Examiner* — Alford W Kindred
*Assistant Examiner* — Cecile H Vo

(57) ABSTRACT

Query integration across databases and file systems is disclosed. An example method may include streaming data managed by a first database file system for a query. The method may also include streaming data managed by a second database file system for the query. The method may also include joining the streaming data managed by the first database file system with the streaming data managed by the second database file system.

18 Claims, 9 Drawing Sheets

(51) Int. Cl.
*G06F 16/14* (2019.01)
*G06F 16/2455* (2019.01)
*G06F 16/2453* (2019.01)
*G06F 16/25* (2019.01)
*G06F 16/2458* (2019.01)

(52) U.S. Cl.
CPC .... *G06F 16/2471* (2019.01); *G06F 16/24537* (2019.01); *G06F 16/24568* (2019.01); *G06F 16/258* (2019.01)

(58) Field of Classification Search
CPC ......... G06F 17/30613; G06F 17/30619; G06F 17/30634; G06F 17/3087; G06F 17/30545; G06F 17/30442; G06F 17/30498; G06F 17/30516; G06F 17/30; G06F 17/30424; G06F 17/30445; G06F 17/30584; G06F 17/30321; G06F 17/30386; G06F 17/30569; G06F 17/30911; G06F 17/30109; G06F 17/30197; G06F 17/30454; G06F 16/1824; G06F 16/24568; G06F 16/2471; G06F 24/56; G06F 16/258; G06F 16/152; G06F 16/182; G06F 16/24532
USPC ........ 707/706, 714, 741, 767, 769, E17.014, 707/715, E17.108, 711, 713, 826, 707/999.002, 999.003, 999.1, 999.102, 707/722
See application file for complete search history.

(56) References Cited

U.S. PATENT DOCUMENTS

| | | | |
|---|---|---|---|
| 9,794,135 B2* | 10/2017 | Theimer | ................ H04L 41/18 |
| 2004/0034651 A1 | 2/2004 | Amarnath | |
| 2004/0220908 A1* | 11/2004 | Finlay | ............... G06F 16/24534 |
| 2007/0219959 A1* | 9/2007 | Kanemasa | .......... G06F 16/8358 |
| 2011/0191361 A1 | 8/2011 | Himanshu | |
| 2011/0302583 A1 | 12/2011 | Abadi et al. | |
| 2011/0320433 A1 | 12/2011 | Mohiuddin | |
| 2012/0078939 A1* | 3/2012 | Chen | ................ G06F 16/24568 707/769 |
| 2013/0060742 A1 | 3/2013 | Allen | |
| 2013/0198159 A1* | 8/2013 | Hendry | ................ G06F 16/242 707/706 |
| 2014/0101213 A1* | 4/2014 | Ueda | ..................... G06F 16/116 707/827 |
| 2016/0103877 A1* | 4/2016 | Ozcan | ............... G06F 16/24532 707/714 |

OTHER PUBLICATIONS

"Microsoft Big Data Unlock Actionable Insights from Data of All Types and Sizes", Sep. 2011.
"SAS Advances Big Data and Cloud Computing", Mar. 26, 2013.
Trends in BI: Big Data—What is all the fuss about?, Jul. 13, 2012.
Warthen, C et al, "Unifying Data Retention and Access for Structured and Unstructured Data", 2011.
Extended European Search Report dated Nov. 8, 2016; EP Application No. 13880855.5; pp. 10.
Qiming Chen et al., "Stream join revisited 1-15 in the context of epoch-based SQL continuous query"; Idea '12 proceedings of the 16th International database engineering & applications sysmposium', New York, USA; Aug. 8, 2012.
Qiming Chen, Meichun Hsu, "Continuous MapReduce for In-DB Stream Analytics", Prof, CoopIS 2010.
Yu Xu et al., "Integrating hadoop and parallel DBMs"; proceedings of the 2010 International conference on management of data, New York, USA; Jun. 6, 2010.
Microsoft, "Parallel Data Warehouse components—Analytics Platform System", posted online on Apr. 16, 2018, 8 pages. <https://docs.microsoft.com/en-us/sql/analytics-platform-system/parallel-data-warehouse-overviewview=aps-pdw-2016-au7>.
Microsoft, GraySystemsLab, "Polybase", retrieved from the Internet on Sep. 18, 2018, 2 pages. <http://gsl.azurewebsites.net/Projects/Polybase.aspx>.
The Register, "Hadoop goes 'open core' with Cloudera Enterprise", posted online on Jun. 29, 2010, 6 pages. <https://www.theregister.co.uk/2010/06/29/cloudera_enterprise_debuts/>.
Vertica.com, "Vertica". Retrieved from the Internet on Sep. 18, 2018, 12 pages. <http://www.vertica.com/>.
ZDNet.com, "Microsoft's PolyBase mashes up SQL Server and Hadoop", published online on Nov. 15, 2012, 10 pages. <https://www.zdnet.com/article/microsofts-polybase-mashes-up-sql-server-and-hadoop/>.

\* cited by examiner

QUERY INTEGRATION ACROSS DATABASES AND FILE SYSTEMS

BACKGROUND

Databases are used to collect, access, and manage data. Databases are typically organized to support processing of the data. For example, databases are commonly used to implement reservation systems for airlines, car rentals, and hotel chains. Databases are also commonly used to maintain bank account and other financial and customer records, to name only a few non-limiting example uses of databases in various types of businesses.

A database management system (DBMS) may be implemented to define, create, query, and administer databases. Example DBMSs include, but are not limited to, the PostgreSQL system. Other commercial and proprietary DBMSs are also available. While different DBMSs can operate with different databases using standard interfaces (e.g., the SQL standard), the databases are generally not portable across different DBMSs. That is, one type of DBMS often cannot access data stored in a different database structure or format.

DETAILED DESCRIPTION

Figure 1:
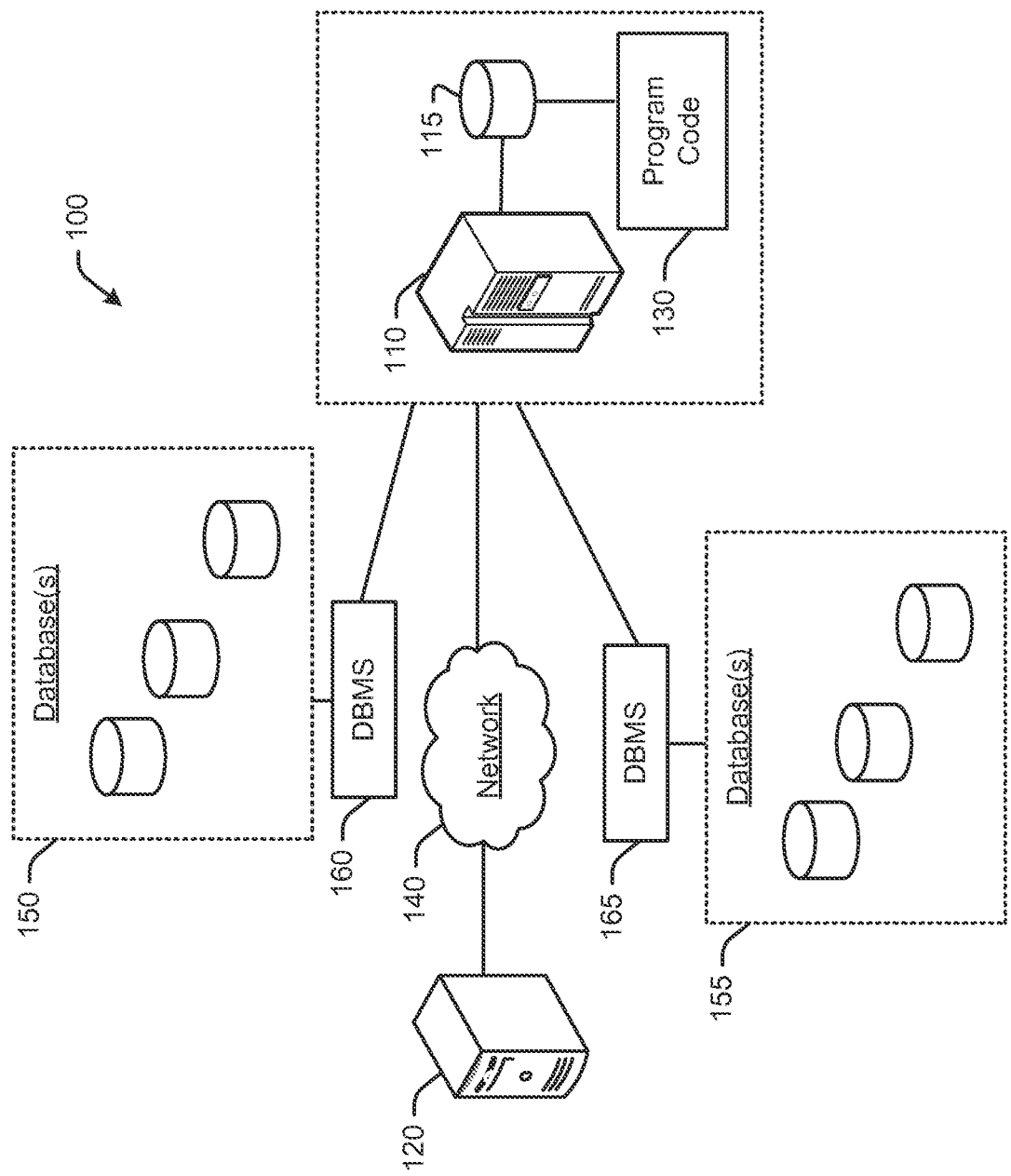
FIG. 1 is a high-level illustration of an example networked computer system which may be implemented for query integration across databases and file systems.

Query integration across databases and file systems is disclosed. By way of illustration, data integration may include running an SQL query on an existing (regular) RDB with the query taking HDFS data as a data source, and the query engine using a function-scan to replace table scan for this purpose. Data integration enables data in an HDFS to stream in the SQL query processed by the query engine of a classical RDB. In this way the HDFS becomes the data source of the query. It is noted that query integration may occur without having to first copy/materialize data from the Hadoop platform to the RDB platform for querying. Accordingly, query integration represents a dynamic "side-by-side" or parallel integration of the different database file systems, and is different than statically merging these file systems.

Many businesses have more than one type of database (e.g., both RDB and HDFS). For example, a bank may maintain current customer records in a RDB for fast access. The bank may also maintain legacy records for long term storage in a HDFS database. There are times, however, when data is needed from both types of database. For example, when generating a report for a bank customer including both historical transactions stored in the HDFS database, and current transactions stored in the RDB.

A DBMS may have an SQL interface to a RDB. The SQL interface is a mature platform suitable for managing structured data on a relatively small scale (e.g., on the order of terabytes). Another DBMS may have a key-value (non-SQL) interface to an HDFS database. HDFS is a distributed, fault-tolerant platform suitable for managing unstructured data on a relatively large scale (e.g., on the order of petabytes).

Although examples are described herein with reference to RDB and HDFS databases, the techniques for query integration across databases and file systems may be applied to any of a wide variety of different types of database structures or formats, and DBMSs.

It is typically not possible to directly query data that is stored in these different database structures or formats. Attempts to access data maintained different database formats or structures have so far involved trade-offs in performance. That is, the data first has to be converted to the same database format that the query engine is configured to operate with. For example, metadata, property description, and transaction type data from an HDFS database can be modeled as relations and then stored in an RDB for access by an SQL query engine. Likewise, content information (e.g., text, image, and voice) in an RDB can be modeled as "big-tables" (e.g., as native Hadoop data objects) and then stored in a HDFS database for access by a Hadoop query engine. Although most data types can be converted to other formats, and then loaded into a different database type for querying, these conversion operations introduce a level of static materialization and corresponding increase in processing and storage overhead.

Query integration across databases and file systems (e.g., across RDB and HDFS databases) is disclosed herein which negates the need to convert data from one database format to another database format prior to query. Integration of different database types using the query integration systems and methods described herein enable data stored in either system to be accessed (e.g., via SQL and/or Hadoop applications). Query integration systems and methods described herein also support a scalable join operation on the data retrieved from both systems in a scalable and efficient manner.

In an example, a query integration system includes a query engine adapted to work with different database structures or formats. During operation, the query engine streams data managed by a first type of database file system (e.g., a RDB). The query engine also streams data managed by a second type of database file system (e.g., an HDFS database). The query engine joins the data managed by the first database file system with the data managed by the second database file system. The joined data can be persisted in an RDB database and/or a HDFS database. Different types and/or numbers of databases may also be used.

It is noted that an example query integration system can be implemented using existing parallel database clusters. That is, instead of having to build a new query engine from the "ground-up," existing query engines may be modified as described herein to leverage already developed attributes for processing queries. For example, a query engine can be modified to retrieve RDB data (e.g., using the existing table-scan function), to retrieve HDFS data (e.g., using the existing function-scan), and join both of these streams using the techniques described herein.

It is also noted that the query integration systems and methods described herein liberate data retrieval by handling data in a streaming context. Streaming data eases memory constraints, and reduces disk access during processing. In addition, the query engine does not have to build large, temporary tables (which may not even be needed after the query), that otherwise would have had to be generated and persisted on a disk.

Before continuing, it is noted that as used herein, the terms "includes" and "including" mean, but is not limited to, "includes" or "including" and "includes at least" or "including at least." The term "based on" means "based on" and "based at least in part on."

FIG. 1 is a high-level illustration of an example computer system which may be implemented for query integration across databases and file systems. System 100 may be implemented with any of a wide variety of computing devices. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 accessed by a client device 120. For purposes of illustration, the host 110 may be configured as a server computer with computer-readable storage 115 storing program code 130 executable by a processor. The program code 130 may include interfaces to application programming interfaces (APIs) and related support infrastructure, such as DBMS(s) and query engine(s). Although, it is noted that the operations described herein may be executed by program code 130 residing on the host 110, another server computer or plurality of server computers (and other types of computing devices) may also be implemented.

In an example, the program code 130 has access to multiple database types via a computer network 140, such as but not limited to a cloud-based network. The databases 150, 155 may store any type of content or data, such as information and/or application data. There is no limit to the type or amount of content that may be stored in the databases 150, 155. In addition, the content may include unprocessed or "raw" data, or the content may undergo at least some level of processing.

FIG. 1 shows two database types 150, 155, each managed by different DBMSs 160, 165, respectively. The databases may be physically distributed in the network 140 and operatively associated with the host 110. Each database may itself include physically distributed nodes.

For purposes of illustration, database 150 may be a RDB and database 155 may be a HDFS database. Each database 150, 155 may be physically distributed on a network, and each database 150, 155 may include physically distributed nodes. The DBMS 160 may provide an SQL interface to data stored in the RDB 150, and DBSM 165 may provide a Hadoop interface to data stored in the HDFS database 165. It is noted, however, that the database types are not limited to any particular type and/or number of databases.

RDB and HDFS databases share some common features. For example, both platforms use clusters of hosts to store large sets of data. The RDB and HDFS databases are different, however, in the type of data each type of database works with best. An HDFS database and Hadoop DBMS is generally considered best suited for tasks involving unstructured data, such as but not limited to natural language content. A RDB and SQL DBMS is generally considered best suited for use with structured data that can be loaded into database tables.

For purposes of illustration, the RDB 150 may be used to store short-term data, such as a bank transactions for customers during the past 12 months. A RDB enables quick access to this type of data, but generally is used to store smaller amounts of data. The HDFS database 155 may be used to store historical and/or legacy data, such as bank transactions for customers extending beyond the most recent 12 months. HDFS databases enable long term storage of large amounts of data, but generally are slower to access and/or process the data. There may be times when data is needed from both types of databases, such as to generate a report of the banking customer's recent and historical transactions. It is noted that use of databases is not limited to the banking industry, and the example is merely illustrative.

The program code 130 may be executed (e.g., by the host 110) to provide query integration across databases and file systems. In an example, a query integration system includes a query engine executable to stream data managed by a first database file system, and stream data managed by a second database file system. The query engine is also executable to join data managed by the first database file system with data managed by the second database file system.

The query engine's streaming capability may be adapted to retrieve data in a stream process context. By way of illustration, the query engine may convert HDFS data (such as big-tables retrievable in terms of native key-value (KV) APIs, or "Hive tables" retrievable in terms of Hive SQL) into a bounded stream to feed an SQL query. This mechanism enables the query to be run using an SQL engine without need for an HDFS query engine. The stream data can be handled by extending "function-scan" as a Stream Source Function (SSF) to reduce processing and/or storage overhead which would otherwise be incurred by "materializing" a table. As such, the HDFS data can be accommodated in any format, rather than first having to be "assimilated" (e.g., to materialized relation tables).

The program code 130 for query integration across databases and file systems may be executed by any suitable computing device. In an example, the program code discussed may be implemented in machine-readable instructions (such as but not limited to, software or firmware). The machine-readable instructions may be stored on a non-transient computer readable medium and are executable by one or more processor to perform the operations described herein. It is noted, however, that these computing devices are described only for purposes of illustration of an example operating environment, and are not intended to limit implementation to any particular system.

Figure 2:
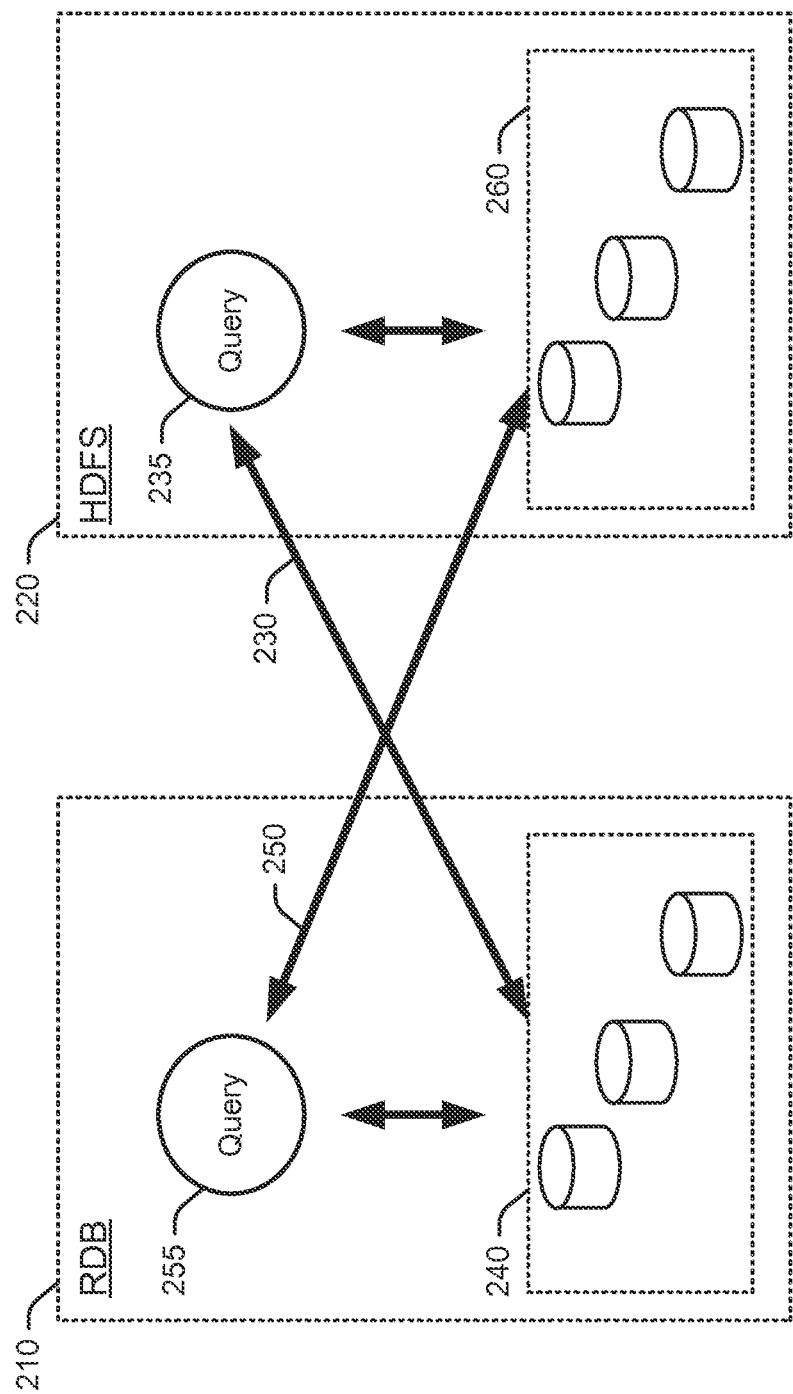
FIG. 2 is a graphical representation illustrating an example of query integration across databases and file systems.

Program code used to implement features of query integration across databases and file systems can be better understood with reference to FIG. 2 and the following discussion of various example functions. However, the operations described herein are not limited to any specific implementation with any particular type of program code.

FIG. 2 is a graphical representation illustrating query integration across databases and file systems. An example implementation of query integration is referred to herein according to an example as "JointBase." JointBase may be implemented as an open infrastructure, including system supported abstract functions which can be configured for use with various database engines (e.g., Sequest, PostgreSQL, MySQL, Vertica), data sources (e.g., Hive-tables, big-tables) and applications (e.g., input/output formats for various Map- Reduce applications). JointBase can be used to access data from different database structures (e.g., RDB SQL and Map-Reduce applications), and to join data from the different database structures.

In an example, JointBase integrates a parallel database platform (e.g., a distributed RDB cluster 210 and a distributed Hadoop cluster 220) on separate server clusters with separate database nodes. JointBase provides an abstract RDB-connector 230 for Hadoop Map-Reduce applications, which enables a Map-Reduce query 235 in the HDFS cluster 220 to retrieve input data from RDB 240 and to persist output data to the RDB 240. The RDB-connector 230 can be adapted to accommodate specific database platforms, and to accommodate applications with specific RDB input/output formats.

JointBase may also provide an abstract Hadoop-connector 250 for SQL queries 255 issued from the RDB cluster 210, to retrieve input data from the Hadoop cluster 210 through function-scan. The Hadoop-connector 250 can be adapted to accommodate the specific database platforms, and to accommodate applications with specific Hadoop input/output formats.

In addition, JointBase may support the join of data from both clusters 210 and 220. In an example, operations start by retrieving data from the HDFS database 260 to fuel SQL queries 255 in a stream processing context. In an example, the stream is bounded (e.g., not infinite).

The database table, which contains a set of tuples on disk, is replaced by a new table function, referred to herein as Stream Source Function (SSF). SSF is configured to return a sequence of tuples to feed queries without first having to store the queries on disk. SSF can read data/record sequence from the HDFS database 260, and generate tuples. SSF may be called multiple times during execution of a query, with each call returning one tuple. The function-scan mechanism provided by the existing query engine (such as the PostgreSQL engine) may be extended to un-block the SSF output to feed the query, tuple-by-tuple, on a continuous basis.

SSF may be supported at two levels: a function scan level, and a query executor level. Typically, a data structure containing function call information bridges these two levels. That is, the function call may be initiated by the query executor and passed in/out of the SSF for exchanging function invocation related information. This mechanism reduces code changes to the query engine, while maximizing extensibility of the query engine in the context of the query integration capabilities described herein.

In an example, SSF may read data records from a Record Iterator (RIR) in the HDFS cluster 220 using a Hadoop API (e.g., the KV API or Hive API). The RIR retrieves data from the HDFS database 260, and outputs data processing results on a record-by-record basis. The RIR may also serve as a data source for the SSF in RDB cluster 210.

A joint database interface may also be used to implement query integration across databases and file systems. There are several ways to implement a joint database interface to query the data from other database formats. For example, a new query engine may be developed to include a joint database interface. In another example, store tables may be constructed in the other database format. Both of these techniques, however, are characterized as "assimilating" data in the other database type.

The JointBase implementation is different, in that JointBase does not "assimilate" one data format to another. Instead, JointBase "accommodates" native data when working between different database formats. That is, JointBase allows an existing query engine to access the data directly (e.g., an HDFS query to access RDB data, and vice versa). As such, tables and functions can be supported over resident data without conversion. In addition, all standard file formats can be supported, and custom file formats can be implemented if desired. All of the data can be retrieved through the query engine function-scan regardless of the underlying database structure or format.

Figure 3:
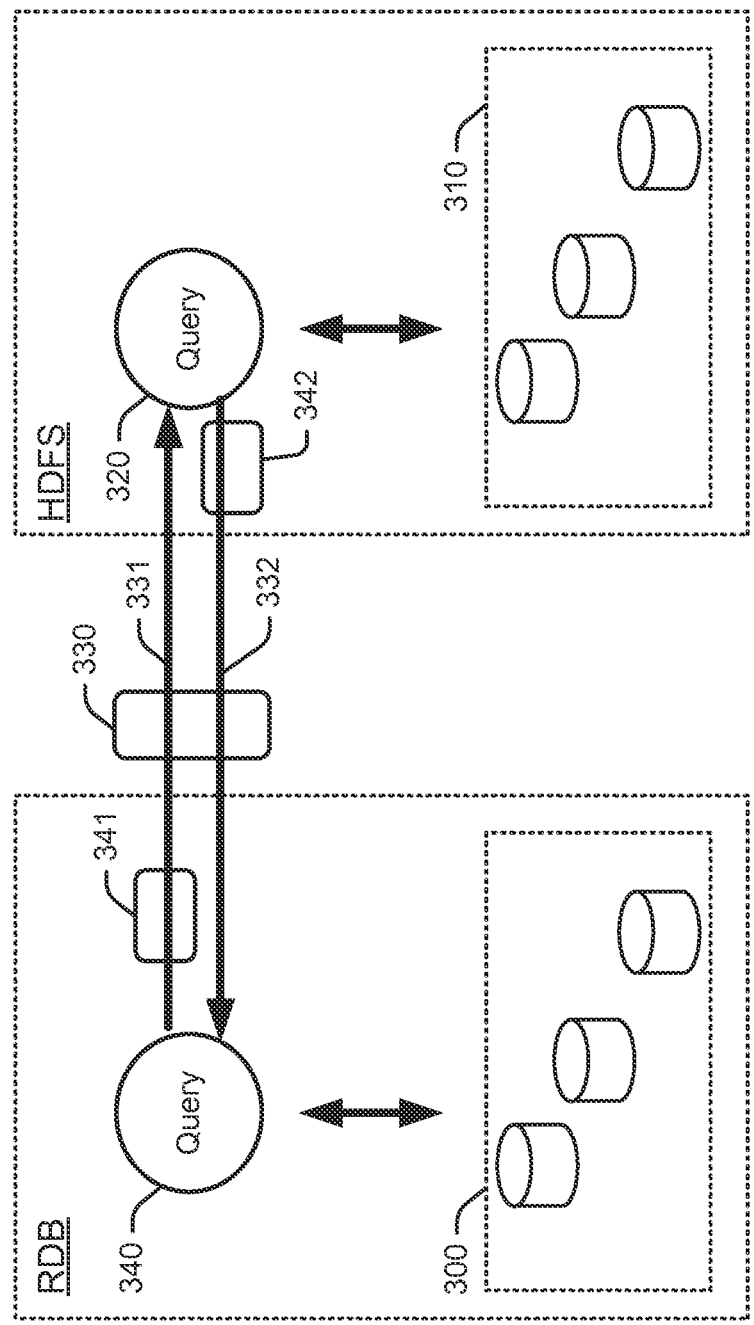
FIG. 3 is a graphical representation illustrating an example of a relational database (RDB) implemented as a Hadoop file system (HDFS) data source and sink.
Figure 4:
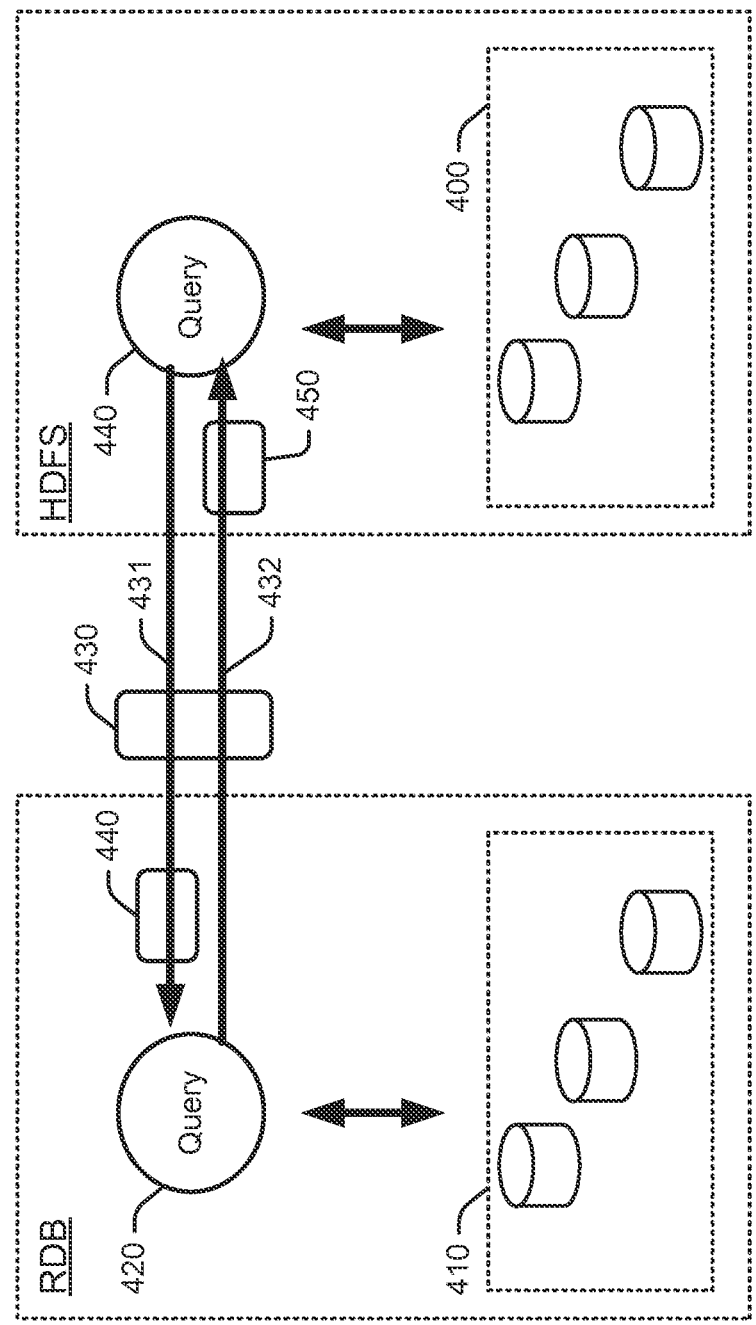
FIG. 4 is a graphical representation illustrating an example of a Hadoop file system (HDFS) database implemented as a data store for a relational database (RDB) application.

To illustrate, example query integration across databases and file systems will now be described below, first for implementing a RDB as a HDFS data source and sink (FIG. 3), and then for implementing an HDFS database as an RDB data store (FIG. 4).

FIG. 3 is a graphical representation illustrating a relational database (RDB) 300 implemented as a Hadoop file system (HDFS) data source and sink. Hadoop applications typically query data in the HDFS database 310 via HDFS queries 320 (e.g., MapReduce). Thus, to enable an HDFS query 320 to access the RDB 300, a joint database interface 330 may be utilized.

In an example, joint database interface 330 enables HDFS queries 320 to access data stored in the RDB 300 through connectors 331, 332. For example, an SQL connector is used for an HDFS query 320 in the RDB 300. In Hadoop, the MapReduce, InputFormat, and OutputFormat objects are overwritten, and abstract DbRecordReader and DbRecordWriter may be extended for specific applications.

Before continuing, some terminology should be understood. A MapReduce function is used to divide the input data-set into separate chunks which can then be processed by map tasks. Outputs of the maps are input to reduce tasks. Typically, both input and output is stored. The MapReduce function handles scheduling tasks, monitoring tasks, and re-executing any failed tasks. InputFormat defines how to read data from a file into the Mapper instances. The OutputFormat defines how to write data to a file into the Mapper instances. DbRecordReader and DbRecordWriter are functions to read and write data records, respectively.

Connector 331 may be used by the joint database interface 330 to read data from RDB 300 for HDFS query 320 as follows. First, the job input format is set to a DbInputFormat class 341. The DbInputFormat class 341 interfaces with the SQL query 340 to read data from RDB 300. Then, a Mapper class is created that accepts DbRecord objects as input to the HDFS query 320.

Connector 332 may be used by the joint database interface 330 to persist or write data to the RDB 300 for HDFS query 320 as follows. First, the output value class of the job is set to DbRecord. The details for storing data are set in a DbOutputFormat class 342. The DbOutputFormat class 342 interfaces with the SQL query 340 to write data to the RDB. Then, a Reduce class is created that adds data to a DbRecord object and calls a write method to store the data in the RDB 300.

In an example, the connectors 331, 332 for reading/writing RDB data may be executed on multiple nodes in a Hadoop cluster. Accordingly, the Hadoop nodes and the database nodes can communicate with each other directly. A direct connection allows data to be transferred in parallel, increasing processing speed.

FIG. 4 is a graphical representation illustrating a Hadoop file system (HDFS) database 400 as a data store 410 for a relational database (RDB) application. RDB applications may query data in the RDB database 410 via SQL queries 420. Thus, to enable the SQL query 420 to access data stored in the HDFS database 400, the SQL query 420 has to access the HDFS database 400.

In an example, data is fetched from the HDFS database 400 by streaming. An iterator 430 may be instantiated to turn HDFS data into stream data. In an example, the iterator 430 replaces the table scan function as a function-scan, thereby making the data source of the query a record generation function. The function scan may be extended to allow non-blocking output (e.g., on a tuple-by-tuple basis).

Feeding (illustrated by arrow 431) HDFS data to an SQL query 420 may be performed by a SSF (Stream Source Function) 440 on the data source of the SQL query. SSF may read data records from a Record Iterator (RIR) in the HDFS cluster using a Hadoop API (e.g., the KV API or Hive API), to retrieve data from the HDFS database 400 and output data processing results on a record-by-record basis.

In an example, the RIR may be implemented using Hadoop OutputFormat and DbRecordWriter. The RIR may run on multiple nodes in the Hadoop cluster, so that the Hadoop nodes and the RDB nodes communicate with each other directly. Direct connections allow data to be transferred in parallel, thereby increasing processing speed.

The SSF/RIR connection is not used to write query results to the HDFS database 400. Instead, SQL query results may be persisted (illustrated by arrow 432) to the HDFS database 400 as follows. An SQL query 420 is executed in the RDB cluster, and retrieves data from either the RDB 410, the HDFS database 400, or both. A Hadoop application uses an RDB-to-Hadoop connector 450 to get the result of the SQL query 420. The data derived from the query result is then persisted to the HDSF database 400 using a mechanism supported by the Hadoop platform (e.g., storing to a big table, or as a Hive table).

FIGS. 3 and 4 illustrate accessing and persisting data for query integration across databases and file systems. Query integration may also be implemented to join data from each database platform. Joining operations are discussed below with reference to FIGS. 5 and 6 illustrating two example scenarios.

Figure 5:
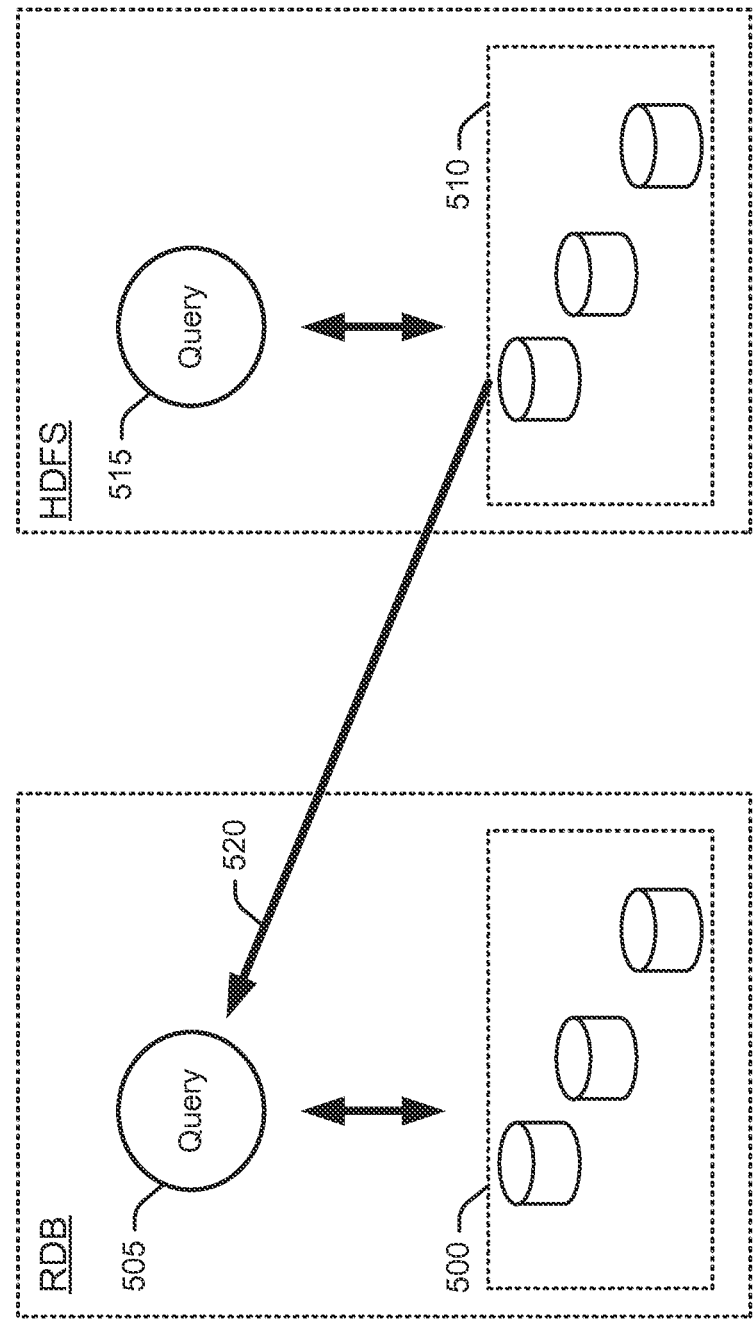
FIG. 5 is a graphical representation illustrating an example of join and store operations for a query result to a relational database (RDB).

FIG. 5 is a graphical representation illustrating join and store operations for a query result to a relational database (RDB) 500. In this example, data from the RDB 500 is retrieved by a table-scan 505. Data from the HDFS database 510 is retrieved by function-scan 515. The data from each database is joined using a join function implemented in the HDFS cluster (e.g., in a Hadoop application) by JointBase. The resulting data is then written to the RDB 500 as illustrated by arrow 520 in FIG. 5.

Figure 6:
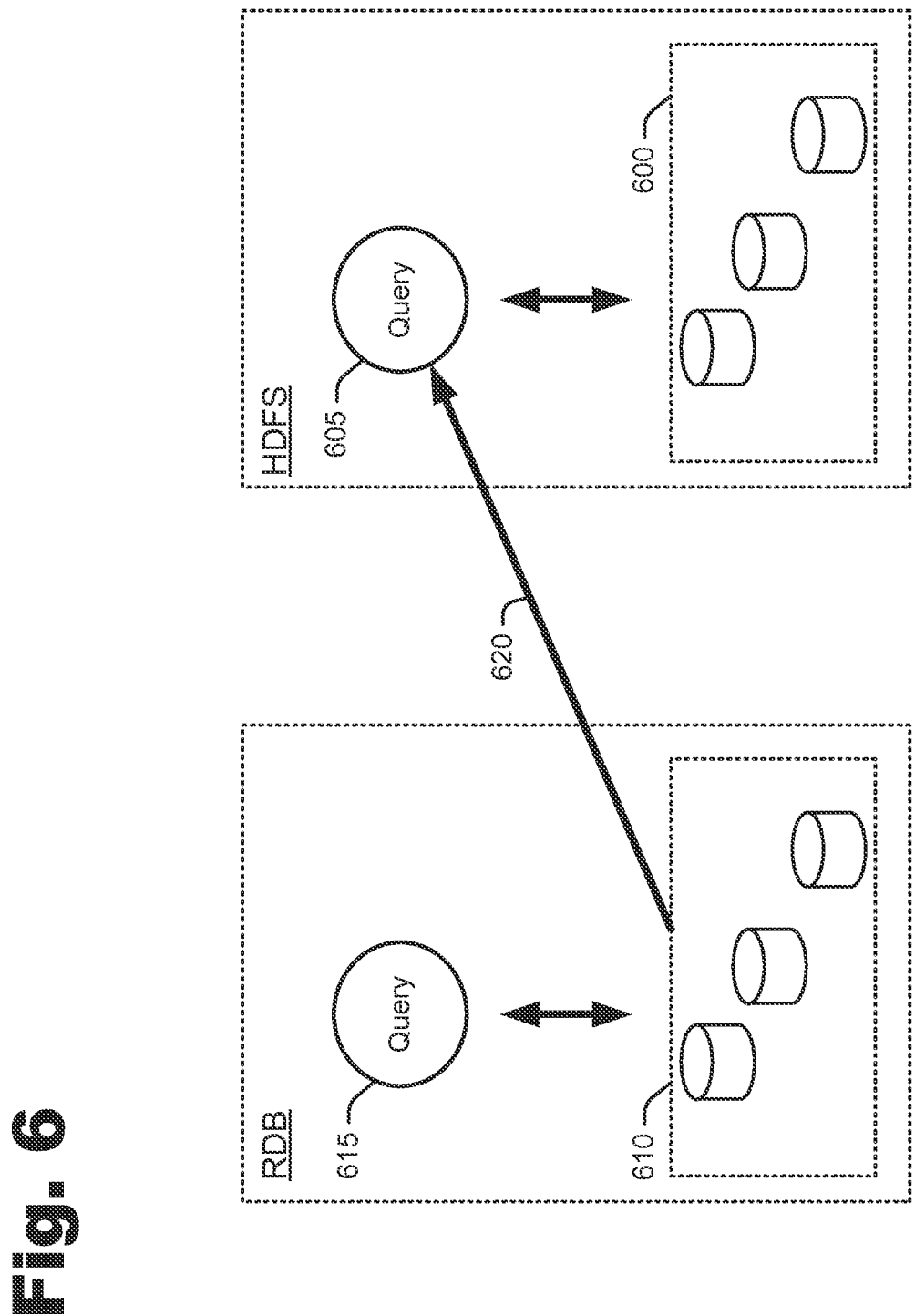
FIG. 6 is a graphical representation illustrating an example of join and store operations for a query result to a Hadoop file system (HDFS) database.

FIG. 6 is a graphical representation illustrating join and store operations for a query result to a Hadoop file system (HDFS) database 600. In this example, data from the HDFS database 600 is retrieved by a table-scan 605. Data from the RDB 610 is retrieved by function-scan 615. The data from each database is joined using a join function implemented in the RDB cluster (e.g., in an SQL application) by JointBase. The resulting data is then written to the HDFS database 600 as illustrated by arrow 620 in FIG. 6.

Before continuing, it should be noted that the examples described above are provided for purposes of illustration, and are not intended to be limiting. Other devices and/or device configurations may be utilized to carry out the operations described herein.

Figure 7A:
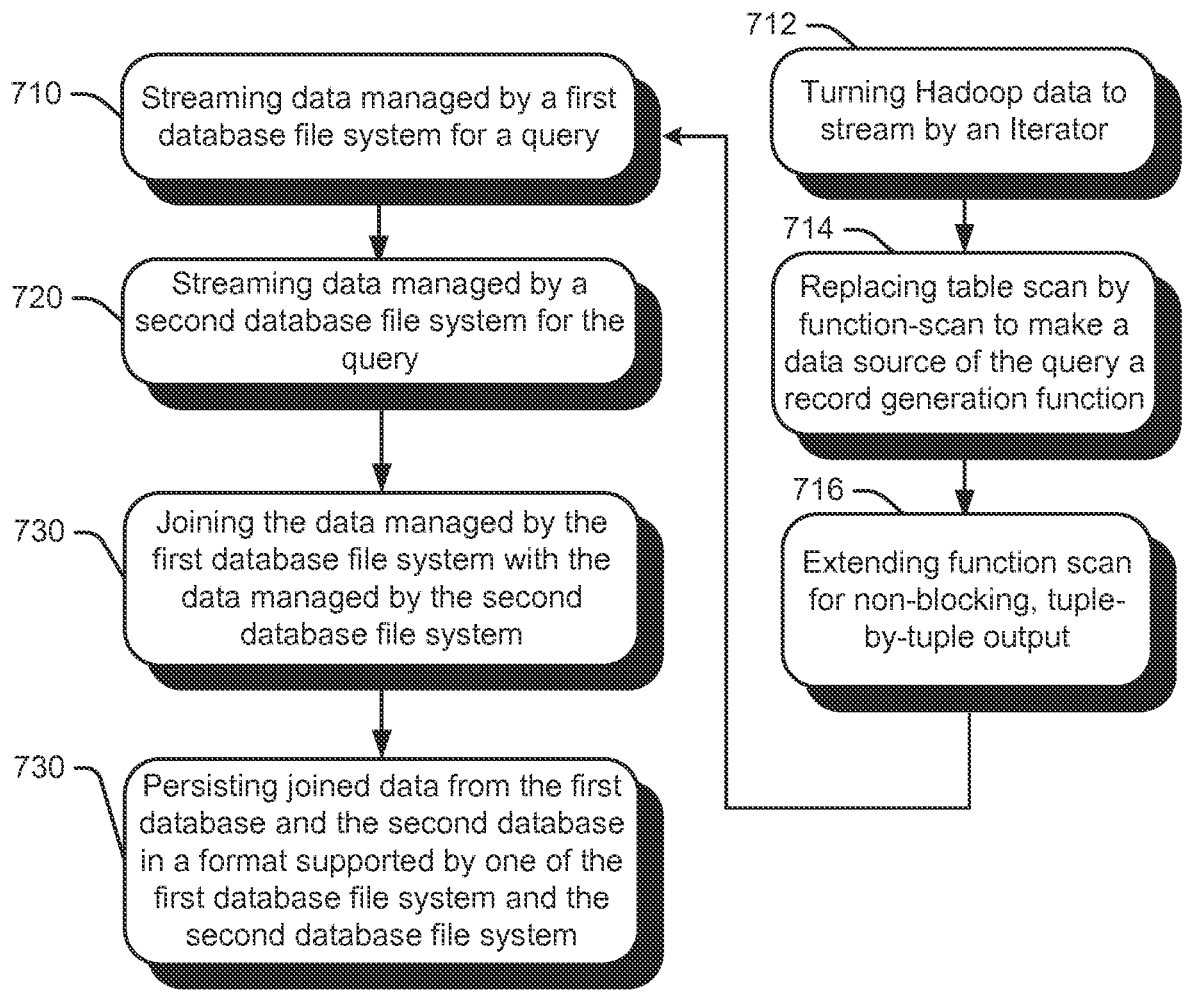
FIGS. 7a-c are flowcharts illustrating example operations to implement query integration across databases and file systems.
Figure 7B:
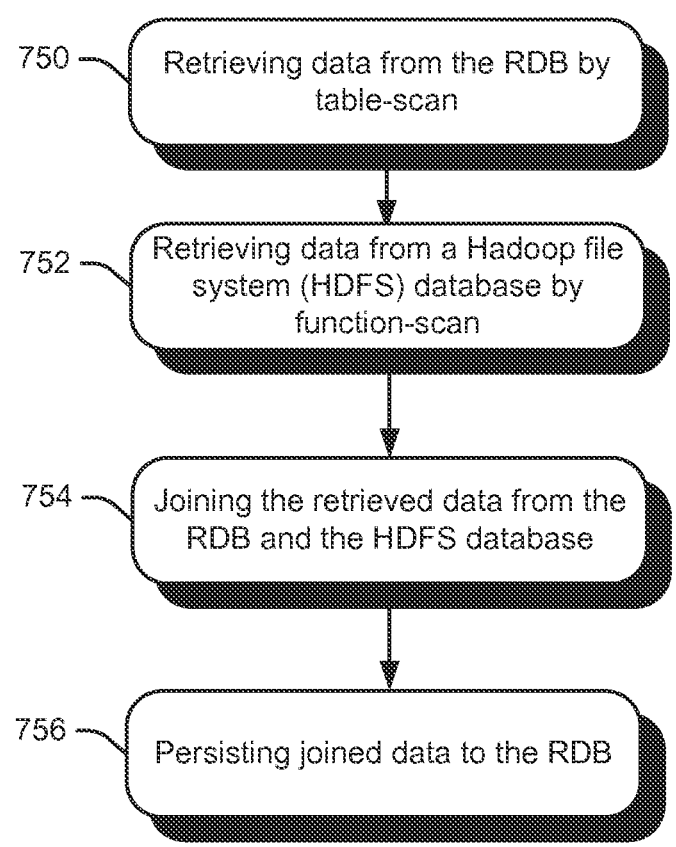
Figure 7C:
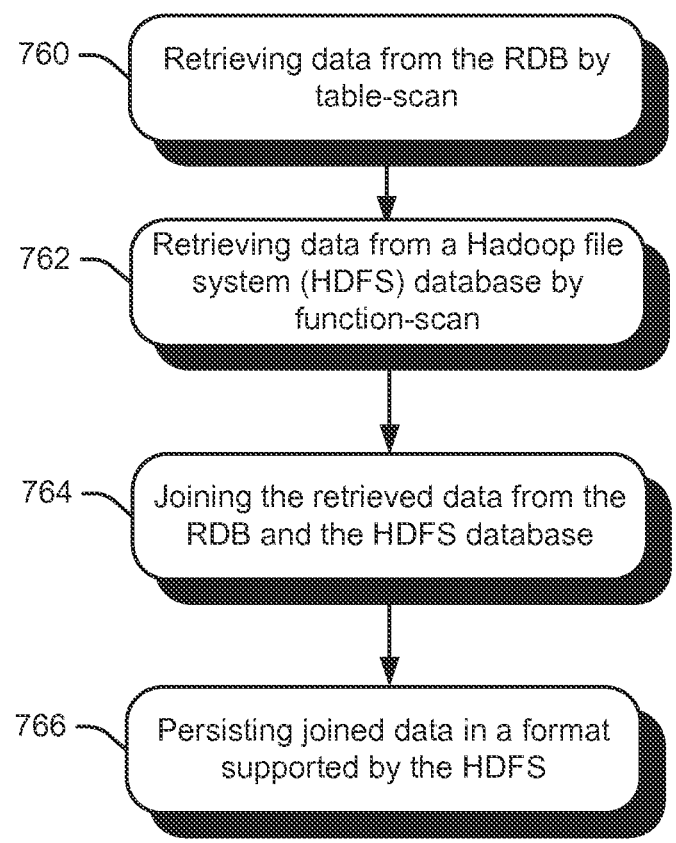

FIGS. 7*a-c* are flowcharts illustrating example operations which may be implemented for query integration across databases and file systems. The operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In FIG. 7*a*, example operation 710 includes streaming data managed by a first database file system for a query. Example operation 720 includes streaming data managed by a second database file system for the query. Example operation 730 includes joining the streaming data managed by the first database file system with the streaming data managed by the second database file system. Example operation 740 includes persisting joined data from the first database and the second database in a format supported by one of the first database file system and the second database file system.

In an example, the operation 710 of streaming data managed by the first database file system may include: example operation 712 of turning Hadoop data to stream by an Iterator; example operation 714 of replacing table scan by function-scan to make a data source of the query a record generation function; and example operation 716 of extending function scan for non-blocking, tuple-by-tuple output.

For purposes of illustration, FIG. 7*b* shows joining and storing query results to an RDB by: example operation 750 of retrieving data from the RDB by table-scan; example operation 752 of retrieving data from an HDFS database by function-scan; example operation 754 of joining the retrieved data from the RDB and the HDFS database; and example operation 756 of writing joined data to the RDB.

By way of further illustration, FIG. 7*c* shows joining and storing query results to an HDFS database by: example operation 760 of retrieving data from the RDB by table-scan; example operation 762 of retrieving data from an HDFS database by function-scan; example operation 764 of joining the retrieved data from the RDB and the HDFS database; and example operation 766 of persisting joined data in a format supported by the HDFS.

The operations shown in FIGS. 7*a-c* and described herein are provided to illustrate example implementations of query integration across databases and file systems. It is noted that the operations are not limited to the ordering shown. Still other operations may also be implemented for query integration across databases and file systems.

In an example, operations for accessing data in a RDB from a Hadoop file system application may include: setting a Hadoop job input format to a database input format (DbInputFormat) class; giving the DbInputFormat class a query to extract data from the RDB; and creating a Mapper class to accept database record objects as input.

In another example, operations for writing data to a RDB from a Hadoop file system application may be by: setting an output value class of a Hadoop job to a database record; setting the details of the table for storing data in the specialized database output format class; and creating a reduce class that adds data to a database Record object and calls a write method to store the data.

Query integration across databases and file systems may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method of query integration across databases and file systems, comprising:

streaming data managed by a first database file system for a query, comprising replacing, utilizing a first connector for executing queries issued by a second database file system, a table source for a query engine executing the query with a function-scan that generates the streaming data from the first database file system, making a data source of the query a record generation function,
  wherein the streaming of the data managed by the first database file system further comprises iteratively retrieving data from the first database file system tuple-by-tuple, and the function-scan allows non-blocking output of the iterative tuple-by-tuple retrieval to generate the streaming data managed by the first database file system;
streaming data managed by the second database file system for the query, including utilizing a second connector to set a job input format to a first input format class for receiving database record objects from the second database file system and to utilize a second input class to accept the database record objects as input to the first database file system; and
joining the streaming data managed by the first database file system with the streaming data managed by the second database file system.

2. The method of claim 1, further comprising persisting joined data in a format supported by one of the first database file system and the second database file system.

3. The method of claim 1, further comprising accessing data in a relational database (RDB) from a Hadoop file system (HDFS), including giving a database input format (DbInputFormat) class a Structured Query Language (SQL) query to extract data from the RDB, wherein the first input format class is the DbInputFormat class.

4. The method of claim 1, further comprising writing data to a relational database (RDB) from a Hadoop file system (HDFS) by:
  setting an output value class of a Hadoop job to a database record;
  setting details of a table for storing data in a database output format class; and
  creating a reduce class that adds data to a database record object and calls a write function to store the data.

5. The method of claim 1, further comprising joining and storing query results to a relational database (RDB) by:
  retrieving data from the RDB by table-scan;
  retrieving data from a Hadoop file system (HDFS) database by the function-scan;
  joining the retrieved data from the RDB and the HDFS database; and
  writing joined data to the RDB.

6. The method of claim 1, further comprising joining and storing query results to a Hadoop file system (HDFS) database by:
  retrieving data from a relational database (RDB) by table-scan;
  retrieving data from the HDFS database by the function-scan;
  joining the retrieved data from the RDB and the HDFS database; and
  persisting joined data in a format supported by the HDFS.

7. A system of query integration across databases and file systems, comprising a query engine stored on a non-transient computer-readable medium and executable by a processor to:
  stream data managed by a first database file system, including replacing, by the query engine and further utilizing a first connector for executing queries issued by a second database file system, a table source for the query engine with a function-scan that generates the streamed data managed by the first database file system, making a data source of a query a record generation function,
    wherein to stream the data managed by the first database file system further comprises iteratively retrieving data from the first database file system tuple-by-tuple, and the function-scan allows non-blocking output of the iterative tuple-by-tuple retrieval to generate the streamed data managed by the first database file system;
  stream data managed by the second database file system utilizing a second connector to set a job input format to a first input format class to receive database record objects from the second database file system and to create a second input class to accept the database record objects as input to the first database file system; and
  join the streamed data managed by the first database file system with the streamed data managed by the second database file system.

8. The system of claim 7, further comprising a Record Iterator (RIR) configured to retrieve data from a Hadoop file system (HDFS) database and output data processing results record-by-record.

9. The system of claim 8, wherein the function-scan comprises a Stream Source Function (SSF) to read data records from the RIR.

10. The system of claim 9, wherein the RIR serves as a data source of the SSF and the SSF serves as the data source of the query.

11. The system of claim 7, wherein the query engine treats a relation database (RDB) as a Hadoop data source and sink.

12. The system of claim 7, wherein the query engine treats a Hadoop file system (HDFS) database as a relational database (RDB) data source.

13. The system of claim 12, wherein the query engine joins data from the HDFS database with data from the RDB.

14. The system of claim 12, wherein the query engine uses the function-scan for streaming in data from the HDFS database without materializing data statically or dynamically.

15. A non-transitory computer-readable medium containing instructions executable by a processor to cause the processor to:
  stream data managed by a first database file system, including replacing, utilizing a first connector for executing queries issued by a second database file system, a table source with a function-scan that generates the streamed data managed by the first database file system, making a data source of a query a record generation function,
    wherein to stream the data managed by the first database file system further comprises iteratively retrieving data from the first database file system tuple-by-tuple, and the function-scan allows non-blocking output of the iterative tuple-by-tuple retrieval to generate the streamed data managed by the first database file system;
  stream data managed by the second database file system utilizing a second connector to set a job input format to a first input format class to receive database record objects from the second database file system and to create a second input class to accept the database record objects as input to the first database file system; and join the streamed data managed by the first database file system with the streamed data managed by the second database file system.

16. The non-transitory computer-readable medium of claim 15, wherein the instructions are further executable by the processor to cause the processor to retrieve data, via a Record Iterator (RIR), from a Hadoop file system (HDFS) database and output data processing results record-by-record.

17. The non-transitory computer-readable medium of claim 15, wherein the function-scan comprises a Stream Source Function (SSF).

18. The non-transitory computer-readable medium of claim 17, wherein a Record Iterator (RIR) serves as a data source of the SSF.

* * * * *